United States Patent [19]

Barron

[11] 4,125,042
[45] Nov. 14, 1978

[54] POSITIVE ADJUST DRIVING CENTER

[76] Inventor: Frank M. Barron, Rte. 3, Clarkesville, Ga. 30523

[21] Appl. No.: 824,549

[22] Filed: Aug. 15, 1977

[51] Int. Cl.² .................. B23B 33/00; B23B 23/02
[52] U.S. Cl. ................................ 82/40 R; 82/33 A
[58] Field of Search ........................ 82/40 R, 33 A

[56] References Cited

U.S. PATENT DOCUMENTS 3,605,533  9/1971  Dugle ............................... 82/40 R

FOREIGN PATENT DOCUMENTS 553,193  12/1956  Italy ............................. 82/40 R
359,340   2/1962  Switzerland .................... 82/40 R
725,439   3/1955  United Kingdom ............. 82/40 R
740,850  11/1955  United Kingdom ............. 82/40 R Primary Examiner—Harrison L. Hinson
Attorney, Agent, or Firm—Howard I. Podell

[57] ABSTRACT

A driving center assembly is provided wherein a work engaging center pin has a bore containing a ball compressed against the flat face of a hemispherical member housed in a socket in the drive shank. The center pin passes through a drive plate which is made rigid with a drive plate through push pins which are urged against the hemispherical member thereby allowing the drive plate and pin to tilt for out of square surfaces by insuring that the push pins exert equal pressure in forcing the drive pins into the work piece.

5 Claims, 3 Drawing Figures

POSITIVE ADJUST DRIVING CENTER

FIELD OF THE INVENTION

This invention appertains to a drive center with positive adjustment for use in machine shops on lathe type machines, monomatics, turret lathes and tracer lathes. The invention features a drive center which provides positive rotation to an endless variety of production run cylindrical items held between centers while being machined.

DISCUSSION OF THE PRIOR ART

The prior art, as exemplified by U.S. Pat. Nos. 3,308,696; 3,057,237; 2,547,858 and 3,120,776 is generally illustrative of various devices of this type.

Current drive centers place more emphasis on the axis of the part being machined than on a length that is to be held to a close tolerance. The length from a shoulder on a work-piece being machined is just as important, and in most cases even more important, because usually the part will be ground with a grind relief at a shoulder, where the shoulder is not to be ground. The lathe operator is responsible for the tolerance on a work-piece from the shoulder to the end of the part. The positive adjust drive center of this invention has true running between centers and a positive location of length. These features are of great importance and represent a vast improvement in drive centers.

On all drive centers which utilize liquid, a problem of proper adjustment is frequently experienced by operators during cold weather. A change in temperature due to the friction of machined parts will cause heat which changes the volume of any fluid within the chamber of the drive center. This is a continuation problem and a factor with liquid-filled equipment. This is especially true and noticeable in situations where liquid-filled chambers are operated after being stopped for an extended period of time. The liquid in the drive centers tends to expand when heated and the liquid contracts when cooled to a lower temperature. As the liquid gets warmer the chamber pushes outward due to the expansion of the liquid, thus pushing the drive pins forward causing an unstable length on the work-part being machined.

SUMMARY AND ADVANTAGES OF THE INVENTION

The advantage offered by my drive center over similar drive centers now available, is its unique feature of positive adjustment. A ball and socket design insures that the push pins exert equal pressure in forcing the drive pins into the end of a work-piece thus compensating for uneven or out-of-square surfaces. The center is in a separate unit that is bolted to the drive shank. The drive plate is attached to this unit by bolts that allow the plate to be flexible for optimum alignment on out-of-square, irregular or rough surfaces. The plate is designed for the center to protrude beyond the plate and for drive spurs to allow the location of the work-piece on a true axis. A spring inside the center maintains tension on the plate when not in use. The ball allows the center to rotate if the work piece slips in the machine during machining.

The principal object of this invention is to provide a device or article of this character which combines simplicity, strength an durability in a high degree, together with inexpensiveness of construction.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

BRIEF DESCRIPTION OF THE DRAWING

In the accompanying drawing, in which is shown one of the various possible illustrative embodiments of this invention, wherein like reference character identify the same or like parts.

DESCRIPTION OF THE PREFERRED EMBODIMENT

Figure 1:
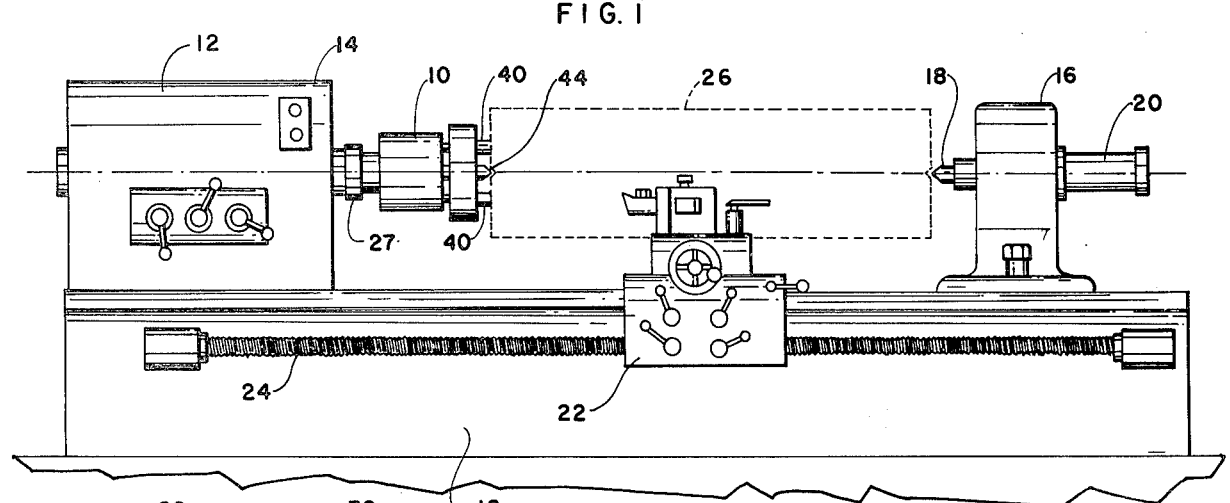
FIG. 1 is a view taken in side elevation of a conventional lathe showing the adjustable center of the invention in use.

With reference to the drawing, there is shown and illustrated an ADJUSTABLE DRIVE CENTER constructed in accordance with the principles of the invention and designated generally by reference character 10.

FIG. 1 shows a lathe indicated generally by reference character 12 which includes a headstock 14, a tail stock 16 with its center 18 in air cylinder 20. The usual cutting tools are mounted on a carriage 22 which is movably mounted on endless screw 24.

A workpiece 26 has holes formed in its opposed ends by a usual center drill to receive tailstock center 18 and the work engaging members of driving center 10 whose shank fits in the generally horizontal spindle 27 of headstock 14 which may be driven directly by a motor having a clutch in its gear train. The workpiece 26 is centered by the rotatable engagement of the pair of centers in holes in the opposed ends of the workpiece.

Figure 2:
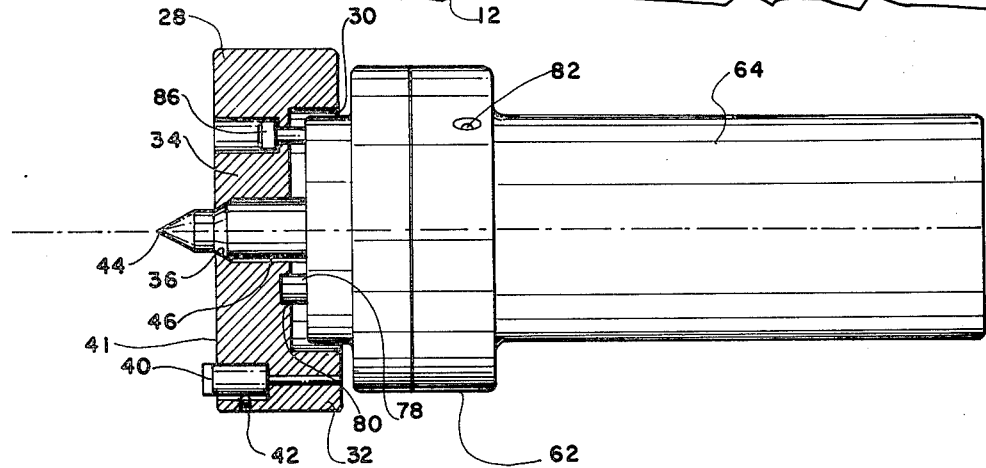
FIG. 2 is a partly sectional view of the center with its constituent parts in position for use.
Figure 3:
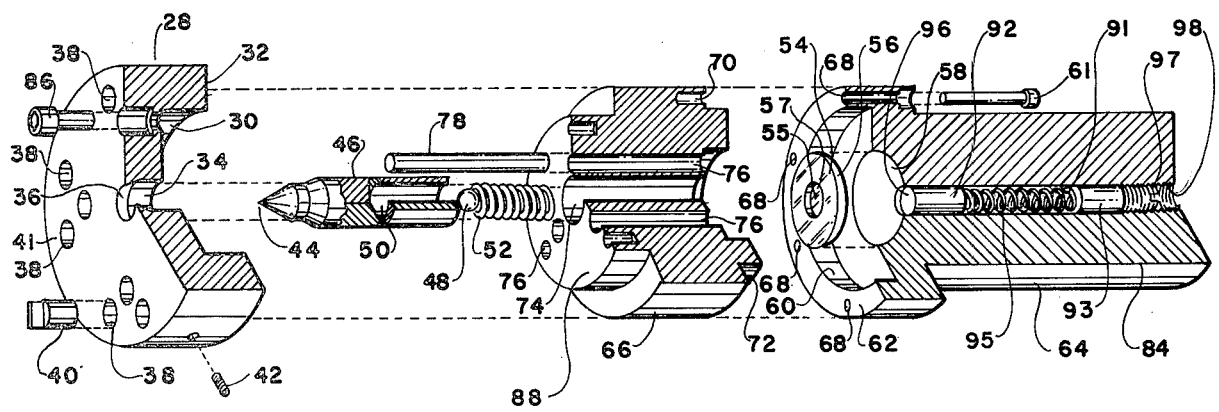
FIG. 3 is a perspective of the invention with the constituent parts separated.

Referring now to FIGS. 2 and 3, the drive center 10 includes drive plate 28 which has a flange enclosing a peripheral recess 30 extending from its inner face 32, a central opening 34 communicating with recess 30 and a tapered end 36. Spaced cavities 38 are provided in the front face 41 of the plate 28 for work engaging drive spurs 40 wnhich are held in place by set screws 42. Generally, six spurs 40 are sufficient for most operations and any number of cavities 38 may be provided in plate 28 so as to change the spacing of the spurs, with the spurs serving to rotate the workpiece.

The pointed head 44 of partly hollow center pin 46 protrudes beyond plate 28. A steel ball 48 in the pin hollow 50 engages one end of expansion spring 52 whose other opposed end bears against the flat bottom face 55 of blind center hole 57 extending from the outer face 54 of hemispherical member 56 whose rounded side is received in concave socket 58 formed in the bottom of concentric recess 60 in the head 62 of externally tapered drive shank 64. Drive shank 64 is secured to drive head 66 by six bolts 61 fitting in bores 68 and 70. Drive head 66 has a peripheral shoulder 72 in its inner face which is received in recess 60. Drive head 66 also has a central bore 74 in which is received pin 46. Equally spaced about bore 74 are three holes 76 for 3 drive pins 78 which have one end in contact with face 54 of member 56, and the other end received in countersunk holes 80 in drive plate 28. This arrangement prevents plate 28 from turning relative to shank 64 while the piece is machined. A grease fitting 82 is provided in head 62 of drive shank 64 (FIG. 2). An air groove 84 is provided along the exterior of drive shank 64 as air relief when using on a machine where an air cylinder is used to operate a chuck. This is a safety feature only. Sometimes an air leak may occur in the cylinder of machine escaping in the tube or spindle of machines causing pressure on the drive center and the drive shank. When removed from the lathe, the drive center on existing machines may pop out under pressure and cause damage to slide ways on the machine, the drive center or injury to a workman.

In operation, center pin 46 is pushed against ball 48 and against spring 52 acting on tapered shoulder 36 of plate 28 until the workpiece strikes drive spurs 40, fixed in drive plate 28. Drive plate 28, in turn, slides along shoulder bolts 86 secured to the front of shoulder 88 of drive head 66, which is received in recess 30 of drive plate 28, until it hits drive pins 78 which push against the face 54 of member 56. The clearance between bore 34 and body 46 allow for necessary angular corrections of point 44.

A through axial hole 91 extends in drive shank 64 enclosing a pair of slidable spaced blocks 92, 93 spaced apart by a compression spring 95. Forward block 92 is formed on its front face as a concave recess 96 of a size to slidably bear against rear hemispherical face 59 of member 56. A set screw 97 is threaded to a female screw thread 98 in the walls of hole 91 to permit tightening of compression spring 95.

Machines such as engine lathes, monomatics, turret lathes and tracer lathes can use this drive center effectively to improve quality and increase production. In many instances, the end of a work piece is not square with the center line due to being sawed, cast, or forged. The advantage of using a drive center to provide rotation is that the work piece may be machined over its entire length since it is driven from the end by means of drive pins or spurs which are forced into the surfaces of the material either by an air operated tailstock or by a screw type tailstock center.

The main advantage offered by the center depicted in the sectional view over similar centers now available is the feature of positive adjustment. The ball and socket design insures that the six work engaging pins 40 exert equal pressure in forcing the drive spurs into the end of a work piece and compensates for uneven or out-of-square surfaces.

It should be mentioned that this type center can be made for any type machine spindle and for any size. It has three hole circles and the drive spurs may be interchanged readily to accomodate work pieces of different diameters. Also, drive plates of different sizes and a greater variety of hole patterns can be interchanged on the same center body to allow for many sizes of shafts or work pieces. The center can be readily interchanged or replaced by removing the drive plate.

All parts of the center subjected to wear are made of abrasion resistant tool steel heat treated for maximum wear resistance. All parts subjected to stress or torque are made from impact resistant tool steel and heat treated for maximum strength. Tolerances and finishes are held within allowable limits to insure precision operation. All parts can be easily replaced in a minimum of time with no special tools required.

Any size drive plate can be used in a size from 9/16 inch to 5 inches. The size of the drive pin is small and carries a large load and stress requirements. The size of the pin 78 can be increased for larger load or pulling power.

The invention has various advantages over existing drives: (1) position hold length, (2) quick and easy change from one type production job to a different job, (3) a ball and socket that will allow the drive plate 28 to tilt for adjustment purposes for out of square, rough and irregular surfaces, (4) the drivers can be made from standard size machine parts with proper hardness that are normally found in machine shops (i.e., broken center drills or end mills), (5) the drive pins can be used repeatedly as long as the length is sufficient to hold in the drive plate. This is accomplished by using spacers behind the drive pins.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

I claim:

1. A work holding center assembly comprising
   a drive plate mounted to
   a drive head extending from
   a drive shank,
   said drive plate having a plurality of spaced work-engaging elements extending from a first side, with the second opposed side of the drive plate facing a first side of the drive head, and with the second opposed side of the drive head facing the external end of the drive shank,
   said drive shank formed with a spherical shaped concave socket extending from the center of the face of the external end of the drive shank and concentrically located in said drive shank, with
   a plug member shaped on one side with a convex spherical surface, said plug member mounted in said concave socket of the drive shank so that the convex surface of the plug member is in slidable relation with the surface of the concave socket,
   said drive head formed with at least one through bore extending from the first side to the second side, with a compression member slidably mounted in each said bore of a length to bear against the second side of the drive plate and against a surface of the plug member opposed to the convex spherical surface so as to support the drive plate in axial compression against the said plug member, and so as to allow the drive plate to tilt with respect to the drive shank, when the space work-engaging elements of the drive plate bear against an uneven surface of a work piece, in which
   a through bore extends concentrically along the axis of the drive head from the first side to the second side, and a through bore extends concentrically through the drive plate, together with
   a center pin of a size to freely fit in both said bores and of a length to extend beyond the drive plate, said center pin fitted with means for bearing against the plug member, so that in use, the axis of the center pin may extend at an angle to the axis of rotation of the drive shank and drive head, when the work-engaging elements of the drive plate bear against an uneven surface of a work piece.

2. The combination as recited in claim 1 in which a peripheral flange extends from the second side of the drive plate about the drive head.

3. The combination as recited in claim 1 in which the means for bearing against the plug of the pin comprise a ball and a compression spring mouned in an axial recess of the pin, with said recess open towards the end of the pin opposed to the end of the pin which extends through the drive plate, and said spring of a length to bear against the flat surface of the plug member and against the ball with the ball bearing against the pin in the direction of the end of the pin which extends through the drive plate.

4. The combination as recited in claim 3 in which the center pin is fitted with means for limiting the distance that it extends beyond the drive plate to prevent the spring from ejecting the pin completely out of the assembly when it is not engaged against a work surface.

5. The combination as recited in claim 3 in which a blind recess extends from the surface of the plug member that is opposed to the convex surface, with said spring of a size to bottom in said recess.

* * * * *